United States Patent
Gründl et al.

(10) Patent No.: US 7,279,820 B2
(45) Date of Patent: Oct. 9, 2007

(54) TRANSVERSAL FLUX MACHINE

(75) Inventors: Andreas Gründl, München (DE);
Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 0 days.

(21) Appl. No.: 10/559,089

(22) PCT Filed: Jun. 3, 2004

(86) PCT No.: PCT/EP2004/006007

§ 371 (c)(1),
(2), (4) Date: Jun. 9, 2006

(87) PCT Pub. No.: WO2004/107541

PCT Pub. Date: Dec. 9, 2004

(65) Prior Publication Data

US 2006/0244329 A1 Nov. 2, 2006

(30) Foreign Application Priority Data

Jun. 3, 2003 (DE) ............ 103 25 085

(51) Int. Cl.
*H02K 21/12* (2006.01)
*H02K 1/12* (2006.01)
*H02K 21/00* (2006.01)

(52) U.S. Cl. .......... 310/156.02; 310/164; 310/257

(58) Field of Classification Search .......... 310/156.02, 310/154.01, 154.06, 154.11, 154.33, 154.35, 310/154.36, 154.41, 154.43, 154.54, 154.27, 310/49 R, 257, 164

See application file for complete search history.

(56) References Cited

U.S. PATENT DOCUMENTS

| | | | | |
|---|---|---|---|---|
| 2,797,346 A | | 6/1957 | Ranseen | 310/46 |
| 3,633,055 A | * | 1/1972 | Maier | 310/156.26 |
| 5,633,551 A | * | 5/1997 | Weh | 310/266 |
| 5,854,521 A | | 12/1998 | Nolle | 310/12 |
| 6,236,131 B1 | | 5/2001 | Schafer | 310/163 |
| 6,455,970 B1 | * | 9/2002 | Shafer et al. | 310/179 |
| 6,949,855 B2 | * | 9/2005 | Dubois et al. | 310/152 |
| 2002/0171315 A1 | * | 11/2002 | Kastinger | 310/254 |

FOREIGN PATENT DOCUMENTS

| | | |
|---|---|---|
| EP | 0128099 A2 | 12/1984 |
| EP | 0218522 A1 | 4/1987 |
| WO | WO99/48190 | 9/1999 |
| WO | 3088454 * | 10/2003 |

OTHER PUBLICATIONS

Forms PCT/ISA/210 and 220 International Search Report for PCT/EP2004/006007, Sep. 27, 2004.

* cited by examiner

*Primary Examiner*—Burton Mullins
(74) *Attorney, Agent, or Firm*—Wood, Herron & Evans LLP

(57) ABSTRACT

A machine with transversal flux comprises a stator and a rotor. Therein, either the stator has a coil arrangement and the rotor is provided with permanent magnet elements, or the rotor may have a coil arrangement and the stator is provided with permanent magnet elements. The coil arrangement has at least one cylindrical winding and is encompassed by a magnetic flux yoke which in a sectional view along the centre longitudinal axis of the coil arrangement is approximately C-shaped. The magnetic flux yoke has a leg at each end which at least partially encompasses one face each of the coil arrangement. At one surface area of the coil arrangement several magnetic flux conducting pieces are arranged coaxially with the centre longitudinal axis of the coil arrangement in several rows. Under the formation of an air gap, the permanent magnet elements are arranged whose magnetic orientation towards the air gap is alternating. In certain positions of the rotor relative to the stator the permanent magnet elements are oriented at least partially in alignment with at least some of the magnetic flux conducting pieces. With this arrangement it is achieved that a magnetic flux from one leg of the magnetic flux yoke to the other leg of the magnetic flux yoke alternately flows through the magnetic flux conducting pieces and the permanent magnet elements aligned with these. Here, the magnetic flux alternates from a first axially oriented row of the magnetic flux conducting pieces and the permanent magnet elements aligned with these to a neighbouring second row and back to the first row, while progressing to and fro in an axial direction.

6 Claims, 3 Drawing Sheets

TRANSVERSAL FLUX MACHINE

FIELD OF THE INVENTION

The present invention relates to a machine with transversal flux. In particular, the invention relates to a machine with transversal flux with a stator and a rotor, with either the stator comprising a stator coil and the rotor being provided with permanent magnet elements, or the rotor comprising a rotor coil and the stator being provided with permanent magnet elements.

From WO 99/48190 A1 a machine with transversal flux is known with C-shaped magnetic flux yokes, which additionally comprises I-shaped magnetic flux yokes at the air gap. The machine with transversal flux according to EP 0 218 522 A1 has C-shaped magnetic flux yokes, too, and additionally magnetic flux conducting pieces arranged in axial rows, which are oriented at least partially aligned with the permanent magnets of the rotor. Here, the air gap extends in an axial direction.

Definitions

The term "machine with transversal flux" covers both motors and generators. It is of no significance for the invention whether such a machine is designed as a rotary machine or, for example, as a linear motor. In addition, the invention is applicable both for internal rotor machines and external rotor machines.

Problem on which the Invention is Based

It is the object of the invention to provide a compact and highly efficient machine with transversal flux which allows a high power density.

Inventive Solution

For the solution of this problem the invention teaches a machine with transversal flux with a stator and a rotor. Therein, either the stator has a coil arrangement and the rotor is provided with permanent magnet elements. Alternatively, the rotor may have a coil arrangement and the stator is provided with permanent magnet elements. The coil arrangement has at least one cylindrical winding and is encompassed by a magnetic flux yoke which in a sectional view along the centre longitudinal axis of the coil arrangement is approximately C-shaped. The magnetic flux yoke has a leg at each end which at least partially encompasses one face each of the coil arrangement. At one surface area of the coil arrangement, which faces the permanent magnet elements, several axially oriented magnetic flux conducting pieces are arranged coaxially with the centre longitudinal axis of the coil arrangement in several rows which are spaced in a circumferential direction. Under the formation of an air gap, several permanent magnet elements each whose magnetic orientation towards the air gap is alternating are arranged in a spaced relationship to the magnetic flux pieces in circumferentially spaced rows. In certain positions of the rotor relative to the stator the permanent magnet elements are oriented at least partially in alignment with at least some of the magnetic flux conducting pieces.

With this arrangement it is achieved that a magnetic flux from one leg of the magnetic flux yoke to the other leg of the magnetic flux yoke alternately flows through the magnetic flux conducting pieces and the permanent magnet elements aligned with these. Here, the magnetic flux alternates from a first axially oriented row of the magnetic flux conducting pieces and the permanent magnet elements aligned with these to a neighbouring second row and back to the first row, while progressing to and fro in an axial direction.

Thereby a maximum utilisation of the available space (in particular in the axial direction) in the electrical machine with a very high operation reliability at low manufacturing costs is achieved. Because of the improved space utilisation, the efficiency or the power density of the machine is also increased.

EMBODIMENTS AND DEVELOPMENTS OF THE INVENTION

Preferably, the stator comprises the coil arrangement with the magnetic flux conducting pieces and the rotor is provided with the permanent magnet elements. This avoids the necessity of moving (e.g. rotating) current transfers to a coil arrangement provided in the rotor.

In an embodiment of the invention the coil arrangement may comprise at least one annular cylindrical winding and the approximately C-shaped magnetic flux yoke for an external rotor machine may be arranged in the interior of the annular cylindrical coil arrangement, or for an internal rotor machine, respectively, at the outside of the annular cylindrical coil arrangement.

The two legs of the magnetic flux yoke may extend with an end portion from the respective faces of the coil arrangement to that surface area of the annular cylindrical coil arrangement at which the magnetic flux conducting pieces are arranged. With an internal rotor machine, this surface area is the inner surface area of the annular cylindrical coil arrangement, and with an external rotor machine, it is the outer surface area of the annular cylindrical coil arrangement.

The two end portions may be provided with recesses into which protrude adjacent magnetic flux conducting pieces. Preferably, the recesses have the same width as the projections remaining between them. This allows to arrange the several magnetic flux conducting pieces of each row, which are arranged in several rows, to be essentially equally spaced to one another and to the magnetic flux conducting pieces of neighbouring rows.

The magnetic flux yoke may be constructed of sheet metal plates or sheet metal plate portions. It is also possible that the magnetic flux yoke is formed form iron particles which are pressed and sintered to the corresponding shape. Likewise, mixed forms of these two variants may be used, wherein transition zones from radially oriented sheet metal plate portions to axially oriented sheet metal plate portions are formed from pressed and sintered iron particles.

In particular, the magnetic flux yoke may be constructed as a rolled sheet metal tube in a central portion connecting the two legs, its two legs may be formed as stacked circular disk-shaped radially oriented sheet metal stacks, and/or the two end portions of the legs as sheet metal stacks which are oriented coaxially to the centre longitudinal axis.

The magnetic flux conducting pieces may be formed from solid iron-containing metal, from stacked sheet metal plates, or from iron particles which are pressed and sintered to the corresponding shape. This is primarily dependent on the operating frequency of the current flowing though the coil arrangement, because the eddy current losses in magnetic flux conducting pieces from solid iron-containing metal increase with increasing frequency.

The magnetic flux conducting pieces may have an essentially quadrangular shape. It is also possible to have them assume a shape which tapers towards their ends in width and/or height. Such a shape reduces or minimises the magnetic stray fluxes between neighbouring magnetic flux conducting pieces.

The permanent magnet elements have preferably an essentially quadrangular shape; they may, however, also have a shape which essentially corresponds to the shape of the magnetic flux conducting pieces; i.e. they may be quadrangular, trapezoidal or triangular or rhomboidal, respectively, or the like.

The coil arrangement may be operated either with current of a single phase or may be designed as a multiphase arrangement (preferable more than two). In the latter case, it may comprise several coaxial windings which are arranged adjacent to each other, which are adapted to be operated offset in phase to each other.

One magnetic flux conducting land each may be arranged between two adjacent windings, which extends from one of the magnetic flux conducting pieces to the central portion connecting the two legs, with the conducting land being designed in its dimensions and its choice of material (iron powder, iron plate, solid iron-containing metal) in such a manner that it is capable of conducting the magnetic flux resulting from the phase difference between the currents flowing through its adjoining windings, without reaching the magnetic saturation.

Between neighbouring magnetic flux conducting pieces magnetically essentially ineffective connectors may be arranged which define the relative position of the magnetic flux conducting pieces to each other on the surface area of the coil arrangement.

Further characteristics, properties, advantages, and possible modifications will become apparent for those with skill in the art from the following description which refers to the accompanying drawing.

DETAILED DESCRIPTION OF PREFERRED EMBODIMENTS

Figure 1:
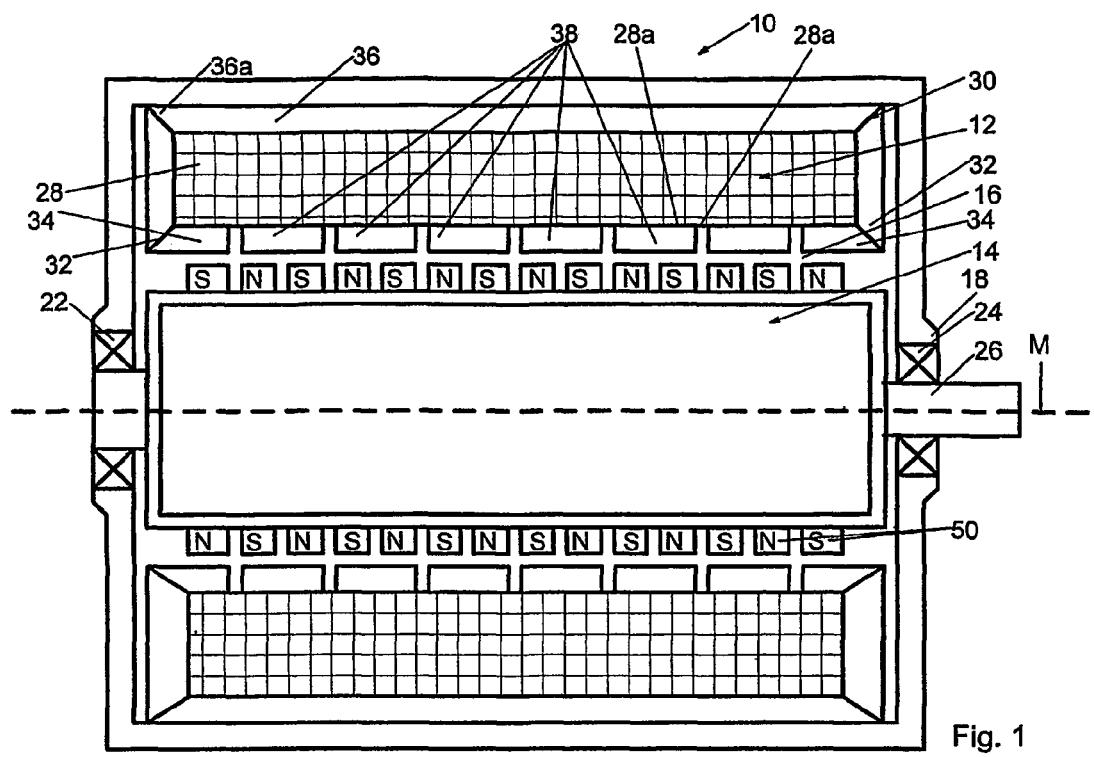
FIG. 1 illustrates a schematic side view of a longitudinal section through an embodiment of a machine with transversal flux according to the invention.
Figure 1A:
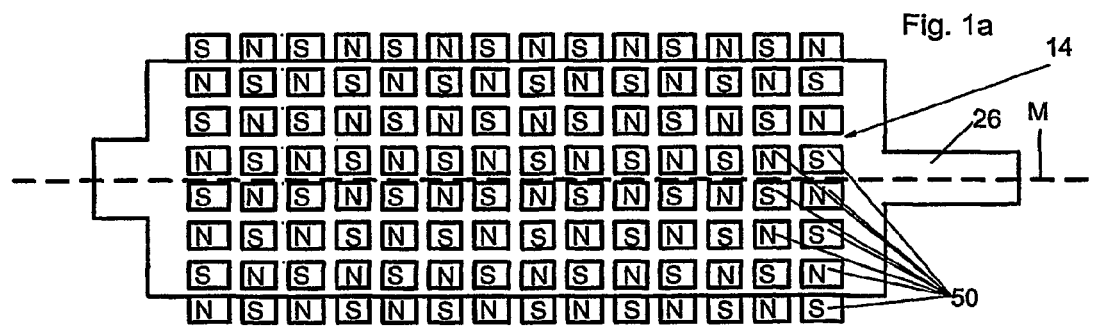
FIG. 1a illustrates a schematic side view of the developed rotor from the machine with transversal flux according to FIG. 1.

FIG. 1 shows a longitudinal section through an embodiment of a machine with transversal flux 10 as an internal rotor machine, with the invention being also applicable to an external rotor machine. The machine with transversal flux 10 has a stator 12 and a rotor 14. An air gap 16 is formed between the rotor 14 and the stator 12. The stator 12 is accommodated in a tubular housing 18 which at its two faces comprises a bearing 22, 24 each for accommodating an output shaft 26. The output shaft 26 is connected with the rotor 14 in the usual manner so as to be non-rotating.

The stator 12 has a coil arrangement 28 with a cylindrical winding which is arranged coaxially with the centre longitudinal axis M of the machine with transversal flux 10. The coil arrangement 28 is encompassed by a magnetic flux yoke 30 which in a sectional view along the centre longitudinal axis M of the coil arrangement is approximately C-shaped. The magnetic flux yoke 30 has a leg 32 each at its two ends which encompasses a respective face of the coil arrangement 28. At the inner surface area 28a of the coil arrangement 28 a plurality of magnetic flux conducting pieces 38 is arranged coaxially with the centre longitudinal axis M of the coil arrangement 28 in several axial rows (see also FIG. 2). The two legs 32 of the magnetic flux yoke 30 extend with an end portion 34 each from the respective faces of the coil arrangement 28 to that surface area 28a of the annular cylindrical coil arrangement 28 at which the magnetic flux conducting pieces 38 are arranged.

The magnetic flux yoke 30 of this embodiment is constructed from several parts. A central portion 36 connecting the two legs 32 is formed as a multilayer rolled sheet metal tube which is oriented coaxially with the centre longitudinal axis. This sheet metal tube has a chamfer 36a each at both ends, which opens funnel-shaped to the outside, at which the two legs 32 conducting the magnetic flux are connected. The two legs 32 are formed as stacked circular disk-shaped radially oriented sheet metal stacks. The two end portions 34 of the legs 32 are formed as sheet metal stacks which are oriented coaxially to the centre longitudinal axis.

Figure 2:
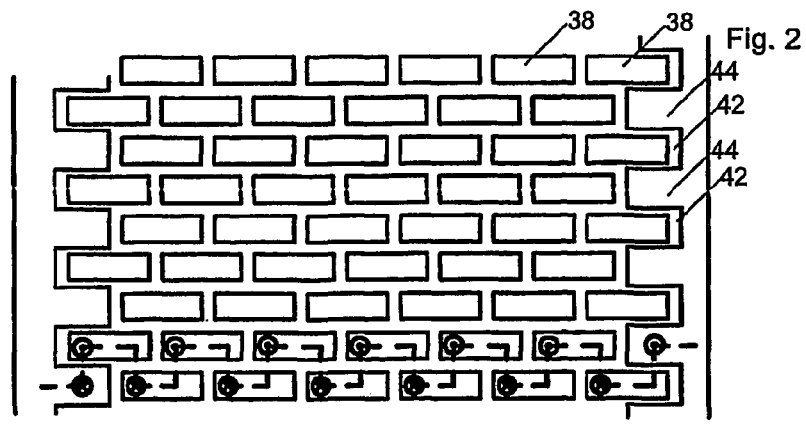
FIG. 2 illustrates a development of a schematic plan view of a stator of the inventive embodiment of the machine with transversal flux from FIG. 1.

As illustrated in FIG. 2, the magnetic flux conducting pieces 38 between the two end portions 34 of the legs 32, which totally surround the ends of the coil arrangement 28, are arranged in rows. The two end portions 34 are provided with recesses 42 into which protrude adjoining magnetic flux conducting pieces 38. Between two neighbouring recesses 42 a projection 44 each is formed at which one magnetic flux conducting piece 38 each is adjoining. Thereby the axial offset oriented along the centre axis of the rotor of neighbouring rows each of magnetic flux conducting pieces 38 by approximately half the length of a magnetic flux conducting piece 38, which also corresponds to the axial depth of one of the cesses 42, is generated as shown in FIG. 2.

Permanent magnet elements 50 are arranged at the rotor 14 about the air gap 16 and spaced in the radial direction from the magnetic flux conducting pieces 38, whose magnetic orientation towards the air gap 16 is alternating. This is illustrated by the chess-board-type alternating poling "N" and "S". In certain positions of the rotor 14 relative to the stator 12 the permanent magnet elements 50 of an axial row of the rotor 14 are in alignment with magnetic flux conducting pieces 38 of an axial row of the stator 12.

The lower part of the FIG. 2 schematically shows the behaviour of the magnetic flux as it is oriented from one side of the stator 12 to the opposite side.

The magnetic flux coming from one, e.g. the r.h. side in FIG. 2—of the magnetic flux yoke 30 through a projection 44 in a radially outward direction via the air gap enters a first permanent magnet element 50 of a first row (not shown in FIG. 2) which is in alignment with same. From the permanent magnet element 50 the magnetic flux tangentially enters a permanent magnet element 50 in the neighbouring row (not shown in FIG. 2). From the first permanent magnet element 50 the magnetic flux flows—via the air gap—into a magnetic flux conducting piece 38 which is in alignment with the element 50 and proceeds axially therein. Subsequently, the magnetic flux proceeds from this magnetic flux conducting piece 38—via the air gap—in a radial direction to a next second permanent magnet element 50 which is located in the same axial row. From there, the magnetic flux proceeds in a radial direction—via the air gap—to a magnetic flux conducting piece 38 aligned with same and proceeds axially therein. The magnetic flux follows this path until it reaches the opposite leg of the magnetic flux yoke.

In other words, the magnetic flux alternately flows through magnetic flux conducting pieces 38 and permanent magnet elements 50 aligned with same. Here, the magnetic flux alternates between a first row of the magnetic flux conducting pieces 38 or the permanent magnet elements 50 aligned with same, respectively, to a neighbouring second row and back to the first row, while progressing to and fro in an axial direction.

Figure 3:
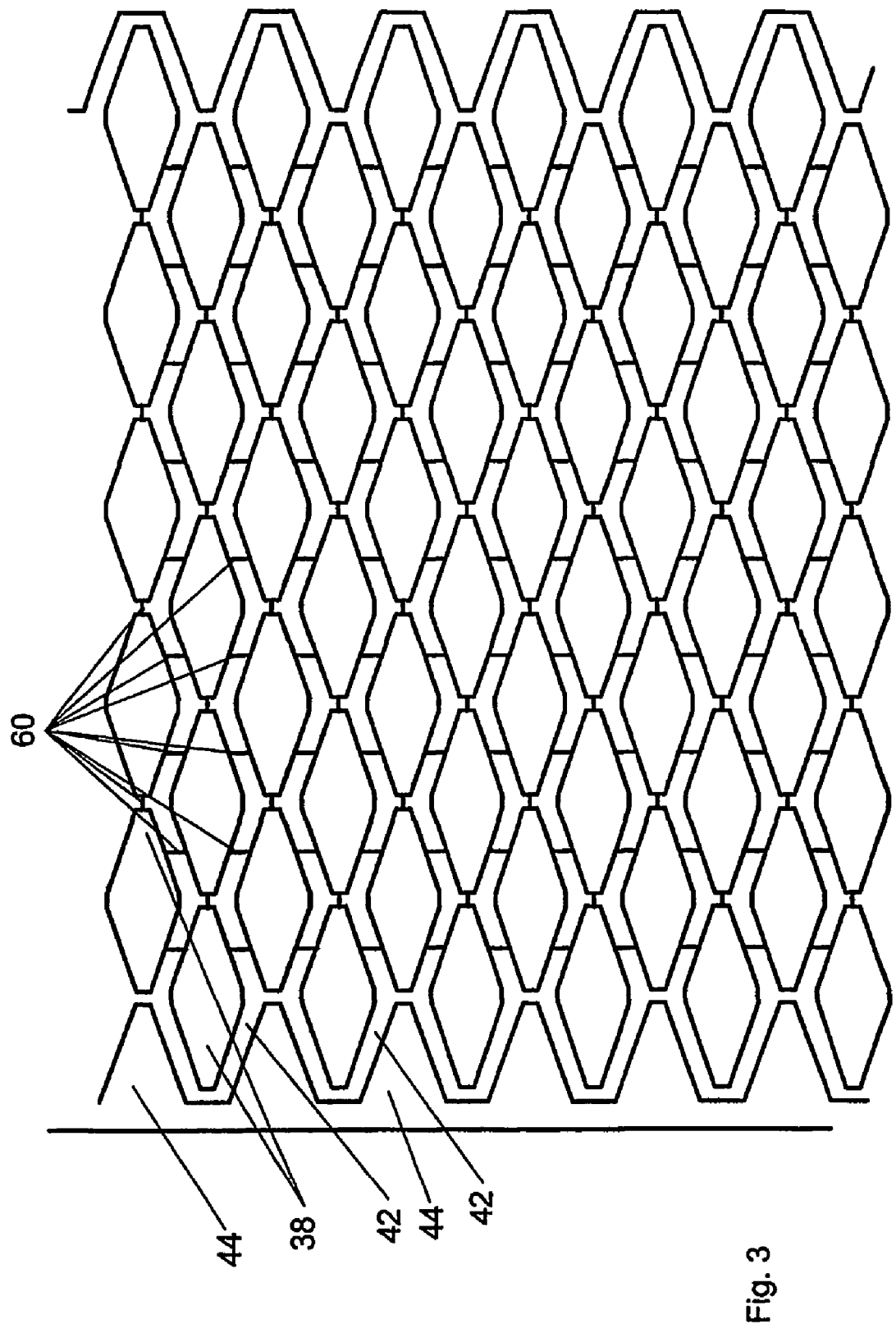
FIG. 3 illustrates a development of a schematic plan view of another embodiment of a stator of the inventive machine with transversal flux from FIG. 1 with modified magnetic flux conducting pieces compared to FIG. 2.
Figure 4:
FIG. 4 illustrates a sectional side view of another embodiment of a magnetic flux conducting piece.

As illustrated in FIGS. 1 and 2, the magnetic flux conducting pieces 38 have an essentially quadrangular shape. The shape of the magnetic flux conducting pieces 38 corresponds to the shape of the permanent magnet elements 50 with the exception of their dimensions in the axial direction. FIG. 3 shows that the magnetic flux conducting pieces 38 may have a shape which tapers in width towards the end portions of the two legs. In addition to the tapering in width, the magnetic flux conducting pieces 38 may also taper in height towards their ends 38*a*. This is illustrated in FIG. 4 in a sectional side view of a magnetic flux conducting piece 38 from FIG. 3. Between neighbouring magnetic flux conducting pieces 38 magnetically essentially ineffective connectors 60 are arranged as shown in FIG. 3 which define the relative position of the magnetic flux conducting pieces to each other. These connectors 60 may either be thin lands from the same material as the magnetic flux conducting pieces 38, which due to their small dimensions immediately reach the magnetic saturation and are therefore virtually magnetically ineffective. Alternatively, the connectors may also be formed by a synthetic material which is introduced between the magnetic flux conducting pieces 38.

The permanent magnet elements 50 may have a shape which essentially corresponds to the shape of the magnetic flux conducting pieces 38; i.e. they may be quadrangular, trapezoidal or triangular or rhomboidal, respectively, or the like. The permanent magnet elements 50 have, however, only half the length in the direction of the centre longitudinal axis M of the magnetic flux conducting pieces 38 aligning with them.

Figure 5:
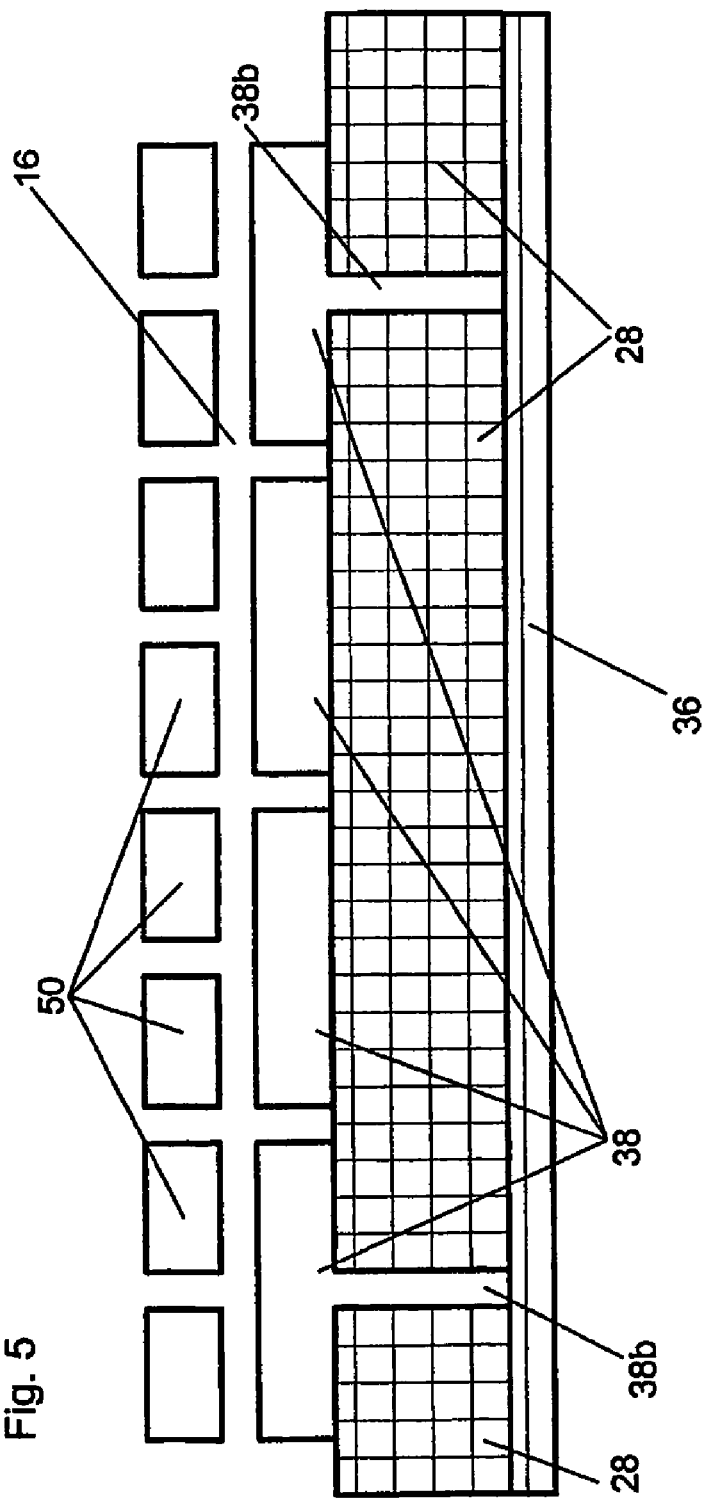
FIG. 5 illustrates an alternative embodiment of magnetic flux conducting pieces between two separate coil portions which form a winding each which in an axial extension may span several magnetic flux conducting pieces.

FIG. 1 illustrates a machine with transversal flux which comprises a coil arrangement with a single cylindrical winding coaxially with the centre longitudinal axis M of the stator. It is, however, also possible to provide several windings which are arranged coaxially adjacent to one another which are current-supplied in a phase offset manner. Each of the individual windings may extend in the axial direction from the centre of one magnetic flux conducting piece 38 to the centre of another magnetic flux conducting piece 38. This is illustrated in FIG. 5, wherein one winding may span several (three in FIG. 5) magnetic flux conducting pieces 38 in the axial direction.

As is apparent, one magnetic flux conducting land 38*b* each is arranged between two adjacent windings of the coil arrangement 28, which extends from one of the magnetic flux conducting pieces 38 to the central portion 36 of the magnetic flux yoke connecting the two legs 32. The magnetic flux conducting land 38*b* is dimensioned and designed in such a manner that it is capable of conducting the magnetic flux resulting from the phase difference between the currents flowing through the two windings, without reaching the magnetic saturation.

The ratios of the individual parts and portions therefrom and their dimensions and proportions as shown in the figures are not to be construed as being limiting. Rather individual dimensions and proportions may differ from the shown ones.

The invention claimed is:

1. A machine with transversal flux (10), comprising a stator (12) and a rotor (14), wherein the stator comprises a coil arrangement (28) and the rotor is provided with permanent magnet elements (50), the coil arrangement (28) comprises at least one cylindrical winding and is encompassed by a magnetic flux yoke (30) which in a sectional view along a center longitudinal axis (M) of the coil arrangement (28) is approximately C-shaped and comprises a leg (32) at each end which at least partially encompasses one face each of the coil arrangement (28), at one surface area (28*a*) of the coil arrangement (28), which faces the permanent magnet elements (50), several axially oriented magnetic flux conducting pieces (38) are arranged coaxially with the center longitudinal axis (M) of the coil arrangement (28) in several rows which are spaced in a circumferential direction, the permanent magnet elements (50) are spaced from the magnetic flux conduction pieces (38) in the radial direction by an intermediate air gap (16), the permanent magnet elements (50) are provided in several rows of permanent magnet elements (50) each, which are circumferentially spaced from each other, and the magnetic orientation of adjacent permanent magnet elements (50) is alternating, and the permanent magnet elements (50) in certain positions of the rotor (12) relative to the stator (14) are oriented at least partially in alignment with at least some of the magnetic flux conducting pieces (38), wherein the two legs (32) of the magnetic flux yoke (30) extend with an end portion (34) each from the respective faces of the coil arrangement (28) to that surface area (28*a*) of the annular cylindrical coil arrangement (28) at which the magnetic flux conducting pieces are arranged, and wherein the two end portions (34) are provided with recesses (42) into which protrude adjacent magnetic flux conducting pieces (38).

2. A machine with transversal flux (10), comprising a stator (12) and a rotor (14), wherein the stator comprises a coil arrangement (28) and the rotor is provided with permanent magnet elements (50), the coil arrangement (28) comprises at least one cylindrical winding and is encompassed by a magnetic flux yoke (30) which in a sectional view along a center longitudinal axis (M) of the coil arrangement (28) is approximately C-shaped and comprises a leg (32) at each end which at least partially encompasses one face each of the coil arrangement (28), at one surface area (28*a*) of the coil arrangement (28), which faces the permanent magnet elements (50), several axially oriented magnetic flux conducting pieces (38) are arranged coaxially with the center longitudinal axis (M) of the coil arrangement (28) in several rows which are spaced in a circumferential direction, the permanent magnet elements (50) are spaced from the magnetic flux conduction pieces (38) in the radial direction by an intermediate air gap (16), the permanent magnet elements (50) are provided in several rows of permanent magnet elements (50) each, which are circumferentially spaced from each other, and the magnetic orientation of adjacent permanent magnet elements (50) is alternating, and the permanent magnet elements (50) in certain positions of the rotor (12) relative to the stator (14) are oriented at least partially in alignment with at least some of the magnetic flux conducting pieces (38),
wherein the magnetic flux yoke (30) is constructed of sheet metal plates or sheet metal plate portions (32, 34, 36) or is formed from iron particles which are pressed and sintered to the corresponding shape, and
wherein the magnetic flux yoke (30) is constructed from a sheet metal tube in a central portion (36) connecting the two legs (32).

3. A machine with transversal flux (10), comprising a stator(12) and a rotor (14), wherein
the stator comprises a coil arrangement (28) and the rotor is provided with permanent magnet elements (50),
the coil arrangement (28) comprises at least one cylindrical winding and is encompassed by a magnetic flux yoke (30) which in a sectional view along a center longitudinal axis (M) of the coil arrangement (28) is approximately C-shaped and comprises a leg (32) at each end which at least partially encompasses one face each of the coil arrangement (28),
at one surface area (28a) of the coil arrangement (28), which faces the permanent magnet elements (50), several axially oriented magnetic flux conducting pieces (38) are arranged coaxially with the center longitudinal axis (M) of the colt arrangement (28) in several rows which are spaced in a circumferential direction,
the permanent magnet elements (50) are spaced from the magnetic flux conduction pieces (38) in the radial direction by an intermediate air gap (16),
the permanent magnet elements (50) are provided in several rows of permanent magnet elements (50) each, which are circumferentially spaced from each other, and the magnetic orientation of adjacent permanent magnet elements (50) is alternating, and
the permanent magnet elements (50) in certain positions of the rotor (12) relative to the stator (14) are oriented at least partially in alignment with at least some of the magnetic flux conducting pieces (38),
wherein there is one magnetic flux conducting land (38b) residing between two adjacent windings, which extends from one of the magnetic flux conducting pieces (38) to the central portion (36) connecting the two legs (32), with the conducting land (38b) being dimensioned in such a manner that it is capable of conducting the magnetic flux resulting from the phase difference between the currents flowing through its adjoining windings, without reaching the magnetic saturation.

4. A machine with transversal flux (10), comprising a stator (12) and a rotor (14), wherein
the stator comprises a coil arrangement (28) and the rotor is provided with permanent magnet elements (50),
the coil arrangement (28) comprises at least one cylindrical winding and is encompassed by a magnetic flux yoke (30) which in a sectional view along a center longitudinal axis (M) of the coil arrangement (28) is approximately C-shaped and comprises a leg (32) at each end which at least partially encompasses one face each of the coil arrangement (28),
at one surface area (28a) of the coil arrangement (28), which faces the permanent magnet elements (50), several axially oriented magnetic flux conducting pieces (38) are arranged coaxially with the center longitudinal axis (M) of the coil arrangement (28) in several rows which are spaced in a circumferential direction,
the permanent magnet elements (50) are spaced from the magnetic flux conduction pieces (38) in the radial direction by an intermediate air gap (16),
the permanent magnet elements (50) are provided in several rows of permanent magnet elements (50) each, which are circumferentially spaced from each other, and the magnetic orientation of adjacent permanent magnet elements (50) is alternating, and
the permanent magnet elements (50) in certain positions of the rotor (12) relative to the stator (14) are oriented at least partially in alignment with at least some of the magnetic flux conducting pieces (38),
wherein the magnetic flux yoke (30) is constructed of sheet metal plates or sheet metal plate portions (32, 34, 36) or is formed from iron particles which are pressed and sintered to the corresponding shape, and
wherein the two legs (32) are formed as stacked circular disk-shaped radially oriented sheet metal stacks.

5. A machine with transversal flux (10), comprising a stator (12) and a rotor (14), wherein
the stator comprises a coil arrangement (28) and the rotor is provided with permanent magnet elements (50),
the coil arrangement (28) comprises at least one cylindrical winding and is encompassed by a magnetic flux yoke (30) which in a sectional view along a center longitudinal axis (M) of the coil arrangement (28) is approximately C-shaped and comprises a leg (32) at each end which at least partially encompasses one face each of the coil arrangement (28),
at one surface area (28a) of the coil arrangement (28), which faces the permanent magnet elements (50), several axially oriented magnetic flux conducting pieces (38) are arranged coaxially with the center longitudinal axis (M) of the coil arrangement (28) in several rows which are spaced in a circumferential direction,
the permanent magnet elements (50) are spaced from the magnetic flux conduction pieces (38) in the radial direction by an intermediate air gap (16),
the permanent magnet elements (50) are provided in several rows of permanent magnet elements (50) each, which are circumferentially spaced from each other, and the magnetic orientation of adjacent permanent magnet elements (50) is alternating,
the permanent magnet elements (50) in certain positions of the rotor (12) relative to the stator (14) are oriented at least partially in alignment with at least some of the magnetic flux conducting pieces (38);
wherein the two legs (32) of the magnetic flux yoke (30) extend with an end portion (34) each from the respective faces of the coil arrangement (28) to that surface area (28a) of the annular cylindrical coil arrangement (28) at which the magnetic flux conducting pieces are arranged; and
wherein the two end portions (34) are provided with recesses (42) into which protrude adjacent magnetic flux conducting pieces (38).

6. A machine with transversal flux (10), comprising a stator (12) and a rotor (14), wherein
the stator comprises a coil arrangement (28) and the rotor is provided with permanent magnet elements (50),
the coil arrangement (28) comprises at least one cylindrical winding and is encompassed by a magnetic flux yoke (30) which in a sectional view along a center longitudinal axis (M) of the coil arrangement (28) is approximately C-shaped and comprises a leg (32) at each end which at least partially encompasses one face each of the coil arrangement (28), at one surface area (28*a*) of the coil arrangement (28), which faces the permanent magnet elements (50), several axially oriented magnetic flux conducting pieces (38) are arranged coaxially with the center longitudinal axis (M) of the coil arrangement (28) in several rows which are spaced in a circumferential direction, the permanent magnet elements (50) are spaced from the magnetic flux conduction pieces (38) in the radial direction by an intermediate air gap (16), the permanent magnet elements (50) are provided in several rows of permanent magnet elements (50) each, which are circumferentially spaced from each other, and the magnetic orientation of adjacent permanent magnet elements (50) is alternating, the permanent magnet elements (50) in certain positions of the rotor (12) relative to the stator (14) are oriented at least partially in alignment with at least some of the magnetic flux conducting pieces (38);

wherein one magnetic flux conducting land (38*b*) residing between two adjacent windings, which extends from one of the magnetic flux conducting pieces (38) to the central portion (36) connecting the two legs (32), with the conducting land (38*b*) being dimensioned in such a manner that it is capable of conducting the magnetic flux resulting from the phase difference between the currents flowing through its adjoining windings, without reaching the magnetic saturation.

* * * * *